United States Patent
Rao

(10) Patent No.: US 11,847,088 B2
(45) Date of Patent: Dec. 19, 2023

(54) DATA TRANSMISSION METHOD AND DEVICE CONNECTING A FPGA WITH AN ARM PROCESSOR

(71) Applicant: BOE Technology Group Co., Ltd., Beijing (CN)

(72) Inventor: Tianmin Rao, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 17/558,316

(22) Filed: Dec. 21, 2021

(65) Prior Publication Data
US 2022/0237142 A1 Jul. 28, 2022

(30) Foreign Application Priority Data
Jan. 25, 2021 (CN) .......................... 202110096289.1

(51) Int. Cl.
G06F 13/42 (2006.01)
G06F 13/12 (2006.01)

(52) U.S. Cl.
CPC .. G06F 13/4282 (2013.01); *G06F 2213/0016* (2013.01)

(58) Field of Classification Search
CPC ......... G06F 13/4282; G06F 2213/0016; G06F 13/124
USPC .............................. 710/3, 9, 20, 30, 105, 315
See application file for complete search history.

(56) References Cited

U.S. PATENT DOCUMENTS

| | | | |
|---|---|---|---|
| 8,250,342 B1* | 8/2012 | Kostarnov | G06F 9/3013 712/35 |
| 10,726,181 B1* | 7/2020 | Voogel | G06F 30/331 |
| 11,074,206 B1* | 7/2021 | Jalal | G06F 13/4013 |
| 2016/0330355 A1* | 11/2016 | Tchouprakov | A61C 9/006 |
| 2018/0027074 A1* | 1/2018 | Collet | H04L 67/1097 709/212 |
| 2018/0032633 A1* | 2/2018 | Greenberg | G06F 16/8373 |

\* cited by examiner

*Primary Examiner* — Idriss N Alrobaye
*Assistant Examiner* — Henry W Yu
(74) *Attorney, Agent, or Firm* — IPro, PLLC

(57) ABSTRACT

The present disclosure provides a data transmission method and device. The data transmission method is used for transmitting data between an advanced reduced instruction set computing machine (ARM) and a field programmable logic gate array (FPGA) via an Inter-Integrated Circuit (IIC) bus, comprising the following steps: receiving, by the FPGA, communication data transmitted by the ARM via the IIC bus, wherein the communication data comprises first address data, first content data and N second content data, N being an integer greater than 0, the first content data and the N second content data being arranged in sequence, and the first address data being address data corresponding to the first content data; and generating, by the FPGA, second address data corresponding to each of the second content data according to the sequence of the N second content data and the first address data.

8 Claims, 2 Drawing Sheets

DATA TRANSMISSION METHOD AND DEVICE CONNECTING A FPGA WITH AN ARM PROCESSOR

CROSS-REFERENCE TO RELATED APPLICATIONS

This application claims priority to Chinese Patent Application No. 202110096289.1 filed in China on Jan. 25, 2021, the entire contents of which are hereby incorporated by reference.

TECHNICAL FIELD

The present disclosure relates to the field of display technologies, and more particularly, to a data transmission method and device.

BACKGROUND

Data transmission is generally required between a plurality of structures included in a display device, and a display device comprises an ARM (Advanced Reduced Instruction Set Computing Machines, advanced R ISC Machines) and a FPGA (Field Programmable Gate Array). Since the ARM and the FPGA are processors of different architectures, data between the two cannot be directly transmitted, but a specific communication means is required to be used, for example, an IIC bus (Inter-Integrated Circuits) is used to realize data transmission between the ARM and the FPGA. The data transmission based on the IIC bus needs to indicate the location where the data is stored, i.e., the total amount of data transmitted is composed of data describing a specific content and the address of the data together, so that the data occupies a large space, resulting in low data processing and transmission efficiency.

SUMMARY

In a first aspect, an embodiment of the present disclosure provides a data transmission method for transmitting data between an advanced reduced instruction set computing machine (ARM) and a field programmable logic gate array (FPGA) via an Inter-Integrated Circuit (IIC) bus, comprising the following steps:

receiving, by the FPGA, communication data transmitted by the ARM via the IIC bus, wherein the communication data comprises first address data, first content data and N second content data, N being an integer greater than 0, the first content data and the N second content data being arranged in sequence, and the first address data being address data corresponding to the first content data; and generating, by the FPGA, second address data corresponding to each of the second content data according to the sequence of the N second content data and the first address data.

Optionally, before the receiving, by the FPGA, communication data transmitted by the ARM via the IIC bus, the method further comprises:

acquiring, by the ARM, data to be transmitted, the data to be transmitted comprising the first content data and the N second content data; and generating, by the ARM, the communication data according to the first content data, the N second content data, and address data corresponding to the first content data.

Optionally, the generating, by the FPGA, second address data corresponding to each of the second content data according to the sequence of the N second content data and the first address data, comprises:

in a case where the second content data is the first second content data of the N second content data, increasing the first address data by 1 as second address data of the second content data; and in a case where the second content data is any one of second to Nth ones of the N second content data, increasing the second address data of (M-1)th second content data by 1 as the second address data of (M)th second content data, M being an integer greater than 1 and less than or equal to N.

Optionally, the FPGA comprises a write control unit and a write control register, and the generating, by the FPGA, second address data corresponding to each of the second content data according to the sequence of the N second content data and the first address data, comprises:

generating, by the write control unit under control of the write control register, second address data corresponding to the second content data.

Optionally, after the generating, by the write control unit, second address data corresponding to the second content data, the method further comprises:

storing, by the write control unit, content data according to a corresponding relationship between the content data and corresponding address data, wherein the content data comprises the first content data and the second content data.

In a second aspect, the disclosed embodiment provides data transmission device for transmitting data between an ARM and a FPGA via an Inter-Integrated Circuit (IIC) bus, comprising a first IIC communication module and a second IIC communication module, wherein the first IIC communication module is implemented in the FPGA, the second IIC communication module is implemented in the ARM, wherein the first IIC communication module includes:

a communication data receiving module for receiving communication data transmitted by the ARM via the IIC bus, wherein the communication data comprises first address data, first content data and N second content data, N being an integer greater than 0, the first content data and the N second content data being arranged in sequence, and the first address data being address data corresponding to the first content data; and an address generation module for generating second address data corresponding to each of the second content data according to the sequence of the N second content data and the first address data.

Optionally, the second IIC communication module comprises:

a to-be-transmitted data acquisition module for acquiring data to be transmitted, the data to be transmitted comprising the first content data and the N second content data; and a communication data generation module for generating the communication data according to the first content data, the N second content data and address data corresponding to the first content data.

Optionally, the communication data receiving module is configured for:

in a case where the second content data is the first second content data of the N second content data, increasing the first address data by 1 as second address data of the second content data; and in a case where the second content data is any one of second to Nth ones of the N second content data, increasing the second address data of (M-1)th second content data by 1 as the second address data of (M)th second content data, M being an integer greater than 1 and less than or equal to N.

Optionally, the first IIC communication module comprises a write control unit and a write control register, and the address generation module is configured for: generating, by the write control unit under control of the write control register, second address data corresponding to the second content data.

Optionally, the first IIC communication module further comprises:

a storage module used for storing, by the write control unit, content data according to a corresponding relationship between the content data and corresponding address data, wherein the content data comprises the first content data and the second content data.

BRIEF DESCRIPTION OF THE DRAWINGS

In order to more clearly illustrate the technical solutions of the embodiments of the present disclosure, a brief description will be given below with reference to the accompanying drawings which are required to be used in the description of the embodiments of the present disclosure; it is obvious that the drawings in the following description are only some embodiments of the present disclosure, and it would have been obvious for a person of ordinary skill in the art to obtain other drawings according to these drawings without involving any inventive effort.

DETAILED DESCRIPTION

Reference will now be made in detail to the embodiments of the present disclosure, examples of which are illustrated in the accompanying drawings. It is to be understood that the present disclosure is intended to be illustrative of the embodiments of the present disclosure, and is not intended to be exhaustive of the embodiments of the present disclosure. Based on the embodiments in the present disclosure, all other embodiments obtained by a person of ordinary skill in the art without inventive effort fall within the scope of the present disclosure.

Embodiments of the present disclosure provide a data transmission method.

The data transmission method is used for transmitting communication data from an advanced reduced instruction set computer (ARM) to a field programmable gate array (FPGA) via an Inter-Integrated Circuit (IIC) bus.

Figure 1:
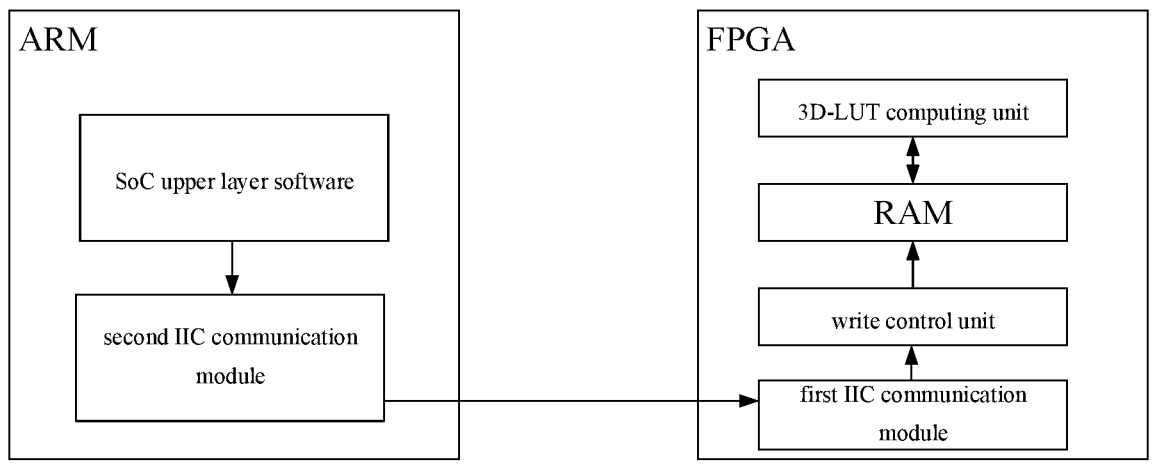
FIG. 1 is a schematic diagram of an application scenario of an embodiment of the present disclosure.

As shown in FIG. 1, since the ARM and the FPGA are processors of different architectures, data transmission between the two cannot be directly transmitted, and therefore data transmission between the ARM and the FPGA needs to be realized through a specific communication mode. In this embodiment, a first IIC communication module is provided in the ARM, and a second IIC communication module is provided in the FPGA, so as to realize data transmission between the ARM and the FPGA based on the IIC protocol.

Figure 2:
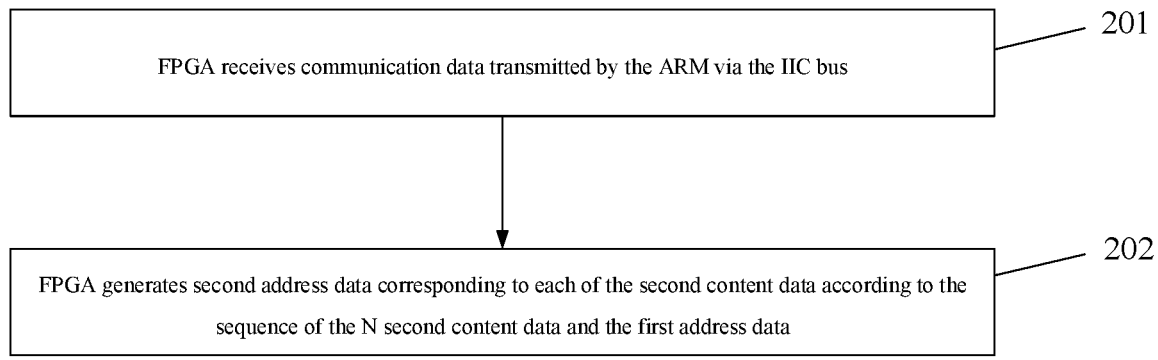
FIG. 2 is a flowchart of a data transmission method of an embodiment of the present disclosure.

As shown in FIG. 2, in one embodiment, the data transmission method comprises the following steps:

Step 201: the FPGA receives communication data transmitted by the ARM over the IIC bus.

The data transmission based on the IIC protocol does not support the continuous storage of data, wherein the continuous storage of data refers to the data transmission storage mode in which the first address of data is given and the subsequent data is stored in sequence. Therefore, when data storage based on the IIC protocol is performed, communication data needs to be transmitted and stored according to the format of "address data-content data"; in the process of data transmission, one address data and one content data are transmitted each time, and then the FPGA end writes the content data into the corresponding storage space one by one according to the address data according to the received communication data. In this process, a large amount of address data needs to be transmitted, which will affect the efficiency of data transmission.

In this embodiment, the communication data comprises first address data, first content data and N second content data, wherein N is an integer greater than 0, the first content data and the N second content data are arranged in sequence, and the first address data is address data corresponding to the first content data.

In this embodiment, the content data comprises first content data and N second content data, and the first content data is understood to be the first content data in the plurality of content data, and during the transmission of the communication data, the first address data corresponding to the first content data is transmitted without the need to transmit the address data corresponding to each second content data.

Step 202: the FPGA generates second address data corresponding to each of the second content data according to the sequence of the N second content data and the first address data.

And after receiving each piece of content data and the first address data, determining the second address data corresponding to each piece of second content data according to the sequence of the N pieces of second content data and the first address data, so that the corresponding address data of each piece of content data can be determined so as to satisfy the format requirement of the data transmitted by the IIC protocol, namely, an "address data-content data" format, and further storing the communication data.

The communication data transmitted via the IIC bus in the embodiment of the present disclosure comprises first address data, first content data and N second content data, wherein N is an integer greater than 0; the first content data and the N second content data are sequentially arranged, and the first address data is address data corresponding to the first content data; furthermore, according to the sequence of the N second content data and the first address data, the FPGA generates second address data corresponding to each of the second content data, such that when data is transmitted via the IIC bus, there is no need to transmit address data corresponding to each content data, which reduces the data processing amount of ARM and the amount of data transmitted through the IIC bus, and helps to improve data processing and transmission efficiency.

In some of these embodiments, step 201 above is further preceded by:

the ARM acquires data to be transmitted, the data to be transmitted comprising the first content data and the N second content data; and the ARM generates the communication data according to the first content data, the N second content data and address data corresponding to the first content data.

In the present embodiment, the ARM end further comprises a processing procedure for communication data, and during implementation, first determining data to be transmitted, then determining the first content data and the N second content data included in the data to be transmitted, and further arranging the first content data and the N second content data in sequence to form the content data of the communication data, and taking the address data corresponding to the first content data as the first address data in the communication data.

In this way, the generated communication data includes only the first address data corresponding to the first content data, and does not include the address data corresponding to the second content data, so that the workload of the ARM side is relatively small, contributing to reducing the workload of the ARM.

In some of these embodiments, the processing of the address data in step 201 above comprises:

in a case where the second content data is the first second content data of N pieces of the second content data, the first address data is increased by 1 as the second address data of the second content data;

in a case where the second content data is any one of second to Nth ones of the N second content data, the second address data of (M-1)th second content data is increased by 1 as the second address data of (M)th second content data, M being an integer greater than 1 and less than or equal to N.

Taking the first address data corresponding to the first content data as 0×000 as an example, when N is equal to 1, the second content data is the first of N second content data, namely, the one closest to the first content data position, and at this time, the first address data is added by 1 as the second address data of the second content data, namely, the second address data corresponding to the first second content data is 0×001.

In the case where N is greater than 1, the second address data of the previous second content data is incremented by 1 as the second address data corresponding to the next second content data. Thus, it can be determined that the second address data corresponding to the second content data is 0×002, the second address data corresponding to the third second content data is 0×003. and the second address data corresponding to the Nth second content data is 0×N.

In some of these embodiments, as shown in FIG. 1, the FPGA comprises a write control unit and a write control register, and the FPGA generates second address data corresponding to each of the second content data according to the sequence of the N second content data and the first address data, comprising:

The write control unit is controlled by the write control register to generate second address data corresponding to the second content data.

In the present embodiment, the generation operation of the second address data is performed by a specific write control unit, and specifically, the working logic of the write control unit specifically performs the above-mentioned address plus 1 operation, thereby achieving the sequential generation of the second address data corresponding to each second content data. The operation of the write control unit is controlled by the write control register.

Specifically, when receiving a copy of the second content data, 1 is input to the write control register, and at this time, the write control unit, under the control of the write control register, executes a generation operation of the second address data, namely, the above-mentioned address data adding 1 operation, so as to generate the second address data corresponding to the second content data. When 0 is input to the write control register after the transmission of the second content data is finished, the write control unit terminates the generation operation of the second address data under the control of the write control register.

In this way, by arranging the write control register in cooperation with the write control unit, the second address data can be generated conveniently and quickly, the workload can be reduced, and the amount of data to be transmitted can be reduced in the case of a transmission format for communication data satisfying the IIC protocol.

In one embodiment, after generating second address data corresponding to the second content data by the write control unit, the method further comprises:

the write control unit stores content data according to a corresponding relationship between the content data and corresponding address data, wherein the content data comprises the first content data and the second content data.

The technical solution of the present embodiment is mainly applied to a scenario in which color management data is transmitted to compensate the display effect of a display device.

It should be noted that the FPGA does not have a central processing unit (CPU)-memory management system; therefore, in the present embodiment, the generated second address data is stored in a specific RAM (Random Access 存储器, random access memory), and during the display process, the content data stored in the RAM is invoked to compensate for the display device.

In one embodiment, the above-mentioned content data comprises a 3D-LUT (three-dimensional look-up table), wherein the 3D-LUT is a compensation scheme for performing color point-by-color point debugging, and the compensation effect thereof is better, but the number of data transmission is relatively large, for example, using an accuracy of 17×17×17, there will be a transmission requirement of 4913 parameters, and if each parameter is transmitted simultaneously with corresponding address data, 9826 data needs to be processed and transmitted. In the technical solution of the present embodiment, address data corresponding to each parameter does not need to be processed at the ARM end, and at the same time, address data corresponding to each parameter does not need to be transmitted between the ARM and the FPGA, reducing the number of data transmission and the number of data processing, contributing to improving the data transmission efficiency and reducing the data processing load.

In related technologies, IIC data transmission requires one address and one data each time, and the transmitted data is written to the storage space corresponding to the address one by one. However, such an operation will occupy a lot of address space in memory and affect the use of other functions. According to the characteristics of the heterogeneous system in the disclosure, the address of the FPGA does not need to occupy the corresponding address space in the ARM, thereby an address management module is independently designed in the FPGA part. After start of the transmission task, the operation of address plus one can be completed automatically to direct the implementation of write logic. According to the IIC data transmission scheme disclosed herein, it is only necessary to enter 1 or 0 to a specific register in the ARM section to turn the write logic task on or off. According to the disclosed IIC data transmission scheme, the occupation of address space can be effectively reduced and the overall operation efficiency can be improved.

Embodiments of the present disclosure provide a data transmission device.

Figure 3:
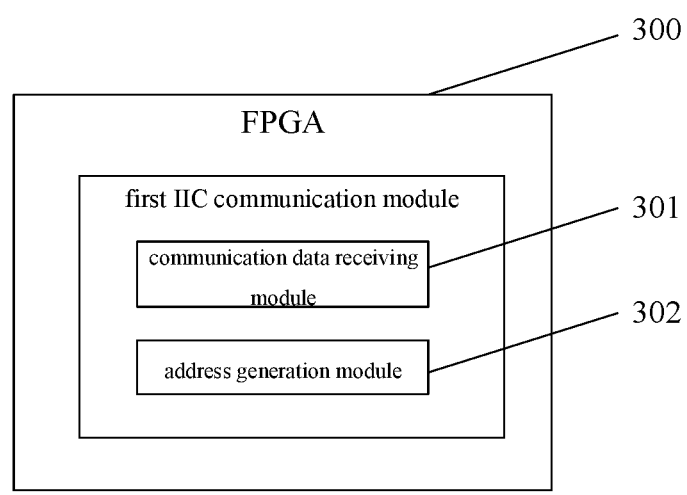
FIG. 3 is a block diagram of a data transmission device of an embodiment of the present disclosure.

The data transmission device is used for transmitting data between an ARM and a FPGA via an Inter-Integrated Circuit (IIC) bus, the data transmission device includes a first IIC communication module and a second IIC communication module, wherein the first IIC communication module is implemented in the FPGA, the second IIC communication module is implemented in the ARM. As shown in FIG. 3, in one embodiment, the first IIC communication module comprises:

a communication data receiving module 301 for receiving communication data transmitted by the ARM via the IIC bus, wherein the communication data comprises first address data, first content data and N second content data, N being an integer greater than 0, the first content data and the N second content data being arranged in sequence, and the first address data being address data corresponding to the first content data; and an address generation module 302 for generating second address data corresponding to each of the second content data according to the sequence of the N second content data and the first address data.

Optionally, the ARM comprises:

a to-be-transmitted data acquisition module for acquiring data to be transmitted, wherein the data to be transmitted comprises the first content data and the N second content data; and a communication data generation module for generating the communication data according to the first content data, the N second content data and address data corresponding to the first content data.

Optionally, the communication data receiving module 301 is specifically used for:

in a case where the second content data is the first second content data of the N second content data, increasing the first address data by 1 as second address data of the second content data; and in a case where the second content data is any one of second to Nth ones of the N second content data, increasing the second address data of (M-1)th second content data by 1 as the second address data of (M)th second content data, M being an integer greater than 1 and less than or equal to N.

Optionally, the FPGA comprises a write control unit and a write control register, and the address generation module 302 is specifically used for: generating, by the write control unit under control of the write control register, second address data corresponding to the second content data.

Optionally, the FPGA further comprises:

a storage module used for storing, by the write control unit, content data according to a corresponding relationship between the content data and corresponding address data, wherein the content data comprises the first content data and the second content data.

The communication data transmitted via the IIC bus in the embodiment of the present disclosure comprises first address data, first content data and N second content data, wherein N is an integer greater than 0; the first content data and the N second content data are sequentially arranged, and the first address data is address data corresponding to the first content data; furthermore, according to the sequence of the N second content data and the first address data, the FPGA generates second address data corresponding to each of the second content data, such that when data is transmitted via the IIC bus, there is no need to transmit address data corresponding to each content data, which reduces the data processing amount of ARM and the amount of data transmitted through the IIC bus, and helps to improve data processing and transmission efficiency.

The data transmission device according to the embodiments of the present disclosure can implement the steps of the embodiments of the data transmission method described above and can achieve substantially the same or similar technical effects, which will not be described in detail herein.

While the present disclosure has been described with reference to specific embodiments thereof, it will be understood by those skilled in the art that various changes may be made and equivalents may be substituted for elements thereof without departing from the scope of the disclosure. Accordingly, the protection sought herein is as set forth in the claims below.

What is claimed is:

1. A data transmission method for transmitting data between an advanced reduced instruction set computing machine (ARM) and a field programmable logic gate array (FPGA) via an Inter-Integrated Circuit (IIC) bus, comprising the following steps:

receiving, by the FPGA, communication data transmitted by the ARM via the IIC bus, wherein the communication data comprises first address data, first content data and N second content data, N being an integer greater than 0, the first content data and the N second content data being arranged in sequence, and the first address data being address data corresponding to the first content data; and generating, by the FPGA, second address data corresponding to each of the second content data according to the sequence of the N second content data and the first address data;

wherein the generating, by the FPGA, second address data corresponding to each of the second content data according to the sequence of the N second content data and the first address data, comprises:

in a case where the second content data is the first second content data of the N second content data, increasing the first address data by 1 as second address data of the second content data; and in a case where the second content data is any one of second to Nth ones of the N second content data, increasing the second address data of (M-1)th second content data by 1 as the second address data of (M)th second content data, M being an integer greater than 1 and less than or equal to N.

2. The data transmission method according to claim 1, wherein before the receiving, by the FPGA, communication data transmitted by the ARM via the IIC bus, the method further comprises:

acquiring, by the ARM, data to be transmitted, the data to be transmitted comprising the first content data and the N second content data; and generating, by the ARM, the communication data according to the first content data, the N second content data, and address data corresponding to the first content data.

3. The data transmission method according to claim 1, wherein the FPGA comprises a write control unit and a write control register, and the generating, by the FPGA, second address data corresponding to each of the second content data according to the sequence of the N second content data and the first address data, comprises:

generating, by the write control unit under control of the write control register, second address data corresponding to the second content data.

4. The data transmission method according to claim 3, wherein after the generating, by the write control unit, second address data corresponding to the second content data, the method further comprises:

storing, by the write control unit, content data according to a corresponding relationship between the content data and corresponding address data, wherein the content data comprises the first content data and the second content data.

5. A data transmission device for transmitting data between an ARM and a FPGA via an Inter-Integrated Circuit (IIC) bus, comprising a first IIC communication module and a second IIC communication module, wherein the first IIC communication module is implemented in the FPGA, the second IIC communication module is implemented in the ARM, wherein the first IIC communication module comprises:

a communication data receiving module for receiving communication data transmitted by the ARM via the IIC bus, wherein the communication data comprises first address data, first content data and N second content data, N being an integer greater than 0, the first content data and the N second content data being arranged in sequence, and the first address data being address data corresponding to the first content data; and an address generation module for generating second address data corresponding to each of the second content data according to the sequence of the N second content data and the first address data;

wherein the communication data receiving module is configured for:

in a case where the second content data is the first second content data of the N second content data, increasing the first address data by 1 as second address data of the second content data; and in a case where the second content data is any one of second to Nth ones of the N second content data, increasing the second address data of (M-1)th second content data by 1 as the second address data of (M)th second content data, M being an integer greater than 1 and less than or equal to N.

6. The data transmission device according to claim 5, wherein the second IIC communication module comprises:

a to-be-transmitted data acquisition module for acquiring data to be transmitted, the data to be transmitted comprising the first content data and the N second content data; and a communication data generation module for generating the communication data according to the first content data, the N second content data and address data corresponding to the first content data.

7. The data transmission device according to claim 5, wherein the first IIC communication module comprises a write control unit and a write control register, and the address generation module is configured for: generating, by the write control unit under control of the write control register, second address data corresponding to the second content data.

8. The data transmission device according to claim 7, wherein the first IIC communication module further comprises:

a storage module used for storing, by the write control unit, content data according to a corresponding relationship between the content data and corresponding address data, wherein the content data comprises the first content data and the second content data.

* * * * *